US000002027H

(19) United States

(12) Statutory Invention Registration

Brown et al.

(10) Reg. No.: US H2027 H

(43) Published: Jun. 4, 2002

(54) FLEXIBLE SLIT VALVE

(75) Inventors: Paul E. Brown, Midland; Timothy R. Socier, Essexville, both of MI (US)

(73) Assignee: Seaquist Closures Foreign, Inc., Crystal Lake, IL (US)

(21) Appl. No.: 09/875,735

(22) Filed: Jun. 6, 2001

(51) Int. Cl.[7] ..... B65D 51/16

(52) U.S. Cl. ..... 215/260; 222/491; 222/490; 215/260; D9/300; 137/455

*Primary Examiner*—Michael J. Carone
*Assistant Examiner*—Lulit Semunegus
(74) *Attorney, Agent, or Firm*—Rockey, Milnamow & Katz, Ltd.

(57) ABSTRACT

A dispensing valve is provided for being sealingly disposed with respect to, and dispensing a product from, a discharge opening of a container. The preferred form of the valve includes a generally annular marginal portion adapted to be sealingly engaged when the valve is sealingly disposed with respect to the container discharge opening. The valve also includes a central head portion extending from the marginal portion. The head portion has an exterior side with a generally concave shape when viewed from outside the container and has an interior side with (1) a planar central area, and (2) a generally curved, radially outer portion which tapers toward the planar central area such that the exterior and interior sides converge toward the planar central area to provide a tapered construction with reduced thickness. The head portion includes a normally closed orifice defined by a plurality of slits that extend (1) transversely through the head portion from the exterior side to the interior side, and (2) laterally from a common origin whereby flaps are defined by the slits with each slit terminating in an outer end which is located laterally beyond the planar central area. The orifice opens by outward displacement of the flaps when the pressure in the interior of the container exceeds the pressure on the exterior of the valve by a predetermined amount. The orifice remains open even when the pressure on the interior of the container does not exceed the pressure on the exterior of the valve.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLEXIBLE SLIT VALVE

CROSS REFERENCE TO RELATED APPLICATION

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a valve for dispensing a product from a container. The valve is especially suitable for use in a dispensing closure for a flexible container which is squeezable.

BACKGROUND OF THE INVENTION AND TECHNICAL PROBLEMS POSED BY THE PRIOR ART

There are a wide variety of packages which include (1) a container, (2) a dispensing system extending as a unitary part of, or attachment to, the container, and (3) a product contained within the container. One type of such a package employs an orifice for discharging a single stream of product (which may be a liquid, cream, or particulate product).

It would be desirable to provide a package that includes a flexible, resilient, self-sealing, slit-type valve at one end of a generally flexible bottle or container. Such a valve should preferably be normally closed and should withstand the weight of the product when the container is completely inverted, so that the product will not leak out. However, it would be desirable for such a valve to open when a sufficient pressure differential is applied across the valve (as when the container is squeezed and the interior is subjected to a sufficient increased pressure, and/or when the exterior of the valve is subjected to suction). It would also be desirable in some applications for such a valve to remain open after being initially opened. It would be especially advantageous to provide a valve that would automatically open when the container pressure is increased a predetermined amount above the atomospheric pressure on the valve exterior (i.e., when the pressure differential across the valve exceeds a predetermined amount), and that would then stay open even after the container pressure decreases below the initial opening pressure (i.e., after the pressure differential across the valve decreases below the initial opening pressure differential). If such a valve were used on a squeezable container, the user would need to invert, and then squeeze, the container briefly only once to open the valve. The contents could then drain through the open valve without requiring the user to continue squeezing the container.

The use of such an improved valved dispensing system would beneficially allow the user to easily locate the valved discharge end of the inverted container over a receiving receptacle or other target area without dripping because the valve would not open until the container is initially squeezed with sufficient force.

It would also be beneficial if such an improved valve could be provided to accommodate manual closing of the valve, if desired, to reseal the package.

Such an improved valve should also facilitate ease of dispensing the product when the interior of the container is pressurized (e.g., when the container is squeezed or when the container internal pressure is increased by other means), or when suction is applied to the exterior of the valve.

It would also be advantageous if such an improved valve could accommodate use with bottles, containers, or packages or have a variety of shapes and that are constructed from a variety of materials.

Further, it would be desirable if such an improved valve could accommodate efficient, high-quality, large-volume manufacturing techniques with a reduced product reject rate to produce a valve with consistent operating characteristics.

The present invention provides an improved dispensing valve which can accommodate designs having the above-discussed benefits and features.

BRIEF SUMMARY OF THE INVENTION

The present invention provides a valve for dispensing a product from a container, and the valve has a unique configuration that opens when the pressure differential across the valve exceeds a predetermined amount (e.g., when the container interior pressure increases to a predetermined amount relative to standard atmospheric pressure outside the container). The valve remains open even when the interior pressure decreases below the predetermined opening pressure. Thus, the user can completely empty the container contents without having to continue squeezing the container once the valve opens. The valve can accommodate discharge of liquids, creams, or particulate matter, including powders.

The valve is adapted for use in dispensing a product from a container having an opening. The valve may be formed as a unitary part of an end of such a container or may be mounted in a separate assembly that is permanently or releasably attached to the container.

The preferred form of the valve is adapted for being sealingly disposed with respect to, and dispensing the product from, the discharge opening of the container. The valve includes a marginal portion adapted to be sealingly engaged when the valve is sealingly disposed with respect to the container discharge opening. The valve also includes a head portion that (1) is laterally inwardly of the marginal portion, (2) has an exterior side for interfacing with ambient environment, and (3) has an interior side for interfacing with the product.

In one embodiment, the valve head portion can be characterized as having an exterior side which includes a laterally outer portion with an arcuate side elevational shape defined by a first radius. The head portion interior side has a laterally outer portion with an arcuate side elevational shape defined by a second radius which is greater than the first radius such that the outer portions of the exterior and interior sides converge toward a central area of the head portion to provide a tapered construction with reduced thickness. The head portion interior side has a periphery defined by a circular, peripheral edge.

The head portion also includes a normally closed orifice defined by a plurality of slits that extend (1) transversely through the head portion from the exterior side to the interior side, and (2) laterally from a common origin whereby flaps are defined by the slits with each slit terminating in an outer end which is located at a distance radially inwardly from the interior side circular, peripheral edge. That distance is less than about 24% of the diameter of the interior side circular, peripheral edge. The orifice opens by outward displacement of the flaps when the pressure in the interior of the container exceeds the pressure on the exterior of the valve by a predetermined amount. The orifice remains open even when the pressure on the interior of the container does not exceed the pressure on the exterior of the valve.

The head portion of the closed valve may also be characterized as having a generally concave shape when viewed from outside the container. The head portion interior side preferably has a planar central area and a generally curved, radially outer portion which tapers toward the planar central area such that the exterior and interior sides converge toward the planar central area to provide a tapered construction with reduced thickness. The head portion includes a normally closed orifice defined by a plurality of slits that extend (1) transversely through the head portion from the exterior side to the interior side, and (2) laterally from a common origin whereby flaps are defined by the slits with each slit terminating in an outer end which is located laterally beyond the planar central area.

In a preferred embodiment, the valve also has a resilient, flexible, connector sleeve having (1) a first end portion thereof connected with the marginal portion of the valve, and (2) a second end portion thereof connected with the head portion. The connector sleeve has an interior surface for interfacing with the product and has an exterior surface for interfacing with ambient environment. The first end portion of the connector sleeve has a J-shaped cross section which extends into the marginal portion to facilitate movement of the head portion when dispensing product from the container. The sleeve exterior surface connects with the head portion along a circular locus. The head portion includes a normally closed orifice defined by a plurality of slits that extend (1) transversely through the head portion from the exterior side to the interior side, and (2) laterally from a common origin whereby flaps are defined by the slits with each slit terminating in an outer end which is located at a distance radially inwardly from the circular locus. Preferably, the distance is less than about 21% of the diameter of the circular locus.

The preferred embodiment of the valve may also be characterized as including a connector sleeve having a resiliently flexible construction. One end portion of the sleeve is connected with the marginal portion of the valve, and an opposite end portion of the sleeve is connected with the head portion. The connector sleeve has a sidewall with a configuration which extends rollingly to shift the valve head portion outwardly when pressure within the container is raised above the predetermined discharge pressure. The sleeve has an exterior surface for interfacing with ambient environment and connecting with the head portion exterior side along a circular locus. The head portion includes a normally closed orifice defined by a plurality of slits that extend (1) transversely through the head portion from the exterior side to the interior side, and (2) laterally from a common origin whereby flaps are defined by the slits with each slit terminating in an outer end which is located at a distance radially inwardly from the circular locus. Preferably, the distance is less than about 21% of the diameter of the circular locus.

The preferred form of the valve connector sleeve may also be characterized as (1) having an exterior surface for interfacing with the ambient environment and connecting with the head portion exterior side along a circular locus; and (2) having a configuration which applies an outwardly directed torque to the valve head portion when pressure within the container is raised above the predetermined discharge pressure to assist in opening the orifice.

A preferred form of the valve head may be characterized as having a generally circular periphery, and the preferred embodiment of the connector sleeve may be characterized as having a resiliently flexible construction with (1) one end portion of the sleeve connected with the valve marginal portion, and (2) an opposite end portion of the sleeve connected with the valve head adjacent the valve head circular periphery. The connector sleeve has an exterior surface for interfacing with ambient environment and connecting with the head portion exterior side along a circular locus. The head portion includes a normally closed orifice defined by a plurality of slits that extend (1) transversely through the head portion from the exterior side to the interior side, and (2) laterally from a common origin whereby flaps are defined by the slits with each slit terminating in an outer end which is located at a distance radially inwardly from the circular locus. Preferably, the distance is less than about 21% of the diameter of the circular locus. The valve head can shift outwardly in a manner which causes the connector sleeve to double over and extend rollingly, and thereby apply a torque to the valve head which assists in opening the orifice.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 4 shows the closed valve in the closure on the container which has been turned over in an inverted orientation prior to dispensing a product from the container;

DETAILED DESCRIPTION

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the dispensing valve of this invention is described in the typical orientation that it would have at the top of a container when the container is stored upright on its base, and terms such as upper, lower, horizontal, etc., are used with reference to this position. It will be understood, however, that the dispensing valve of this invention may be manufactured, stored, transported, used, and sold in an orientation other than the position described.

The dispensing valve of this invention is suitable for use with a variety of conventional or special containers and closures having various designs, the details of which, although not illustrated or described, would be apparent to those having skill in the art and an understanding of such containers and closures. The container per se (and closure, if used) forms no part of the present invention.

Figure 1:
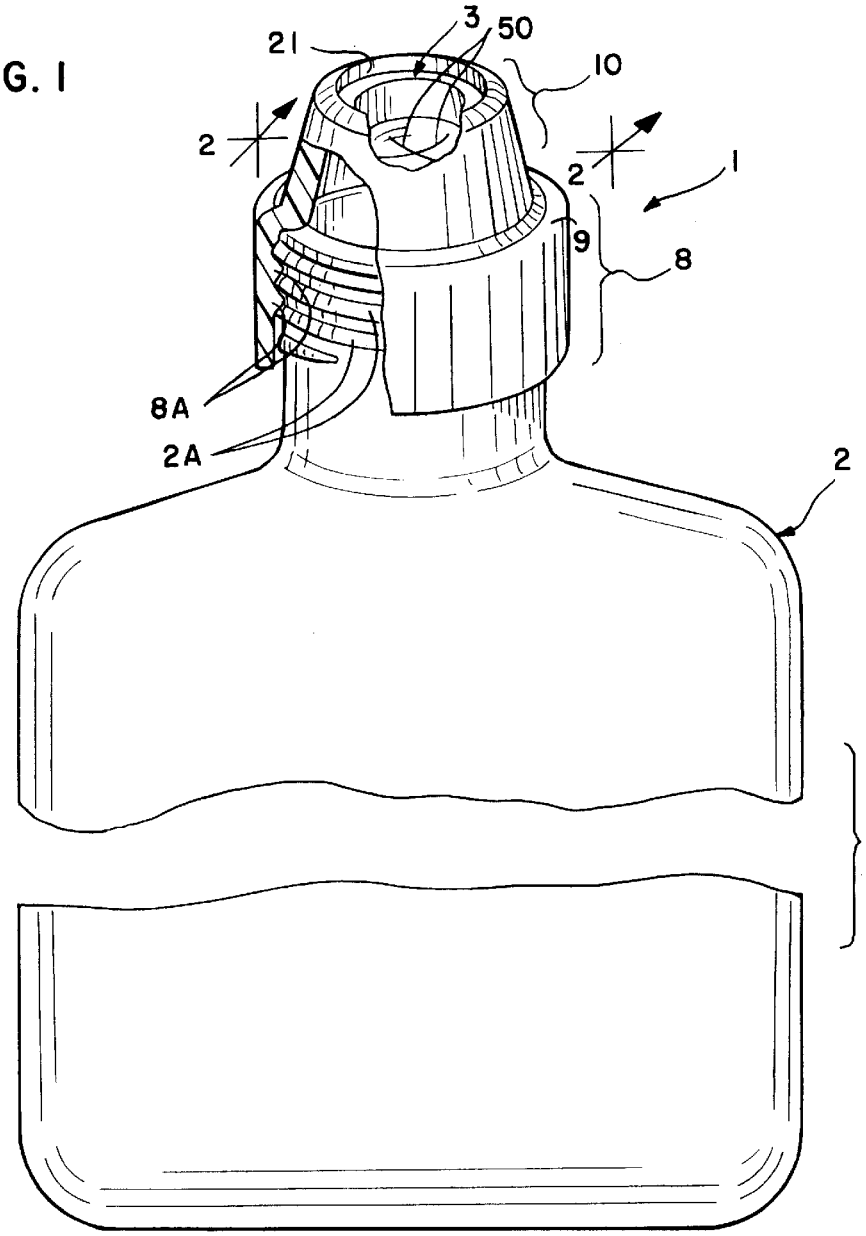
FIG. 1 is a perspective view of a first embodiment of the dispensing valve of the present invention incorporated in a dispensing closure which is formed separately from, and which is adaptable to be releasably or permanently mounted to, a container which has an opening to the container interior.

The presently preferred embodiment of the dispensing valve is generally designated in the figures by the reference number 3. Valve 3 is mounted in a dispensing closure 1 for a container 2 as shown, but may be mounted directly to a container as discussed hereinafter. As can be seen in FIG. 1, closure 1 has a base or skirt 8, an annular shoulder 9 extending radially inwardly from the top of skirt 8, and a reduced diameter spout 10 extending upwardly from the inner portion of shoulder 9 to define an opening 21.

As can be seen in FIG. 1, the interior of skirt 8 defines a thread 8A. Skirt 8 is adapted to receive the upper end of the neck of container 2, and skirt thread 8A is adapted to matingly engage a thread 2A on the neck of container 2.

Alternatively, instead of closure 1 having skirt 8, closure 1 could be provided with some other container connecting means, such as a snap-fit bead (not illustrated) in place of thread 8A for engaging a mating groove (not illustrated) in the neck of container 2. Closure 1 could also be permanently fixed to container 2 by means of induction melting, ultrasonic melting, gluing, or the like, depending on the materials used for the closure and the container.

Closure 1 could also be formed as a unitary part, or extension, of container 2. In some applications, it may be desirable to eliminate closure 1 altogether, and instead attach valve 3 directly to a spout of container 2 or to some other structural feature of a container which defines an opening. Valve 3 could be attached directly to container 2 with adhesive, or with bi-injection molding, or as a structure unitarily molded with container 2, or with other suitable means.

Closure skirt 8 may have any suitable configuration. Container 2 could have any suitable structure for being received within the particular configuration of closure 1, and the main part of container 2 may have a different cross-sectional shape than the container neck and closure skirt 8.

Closure 1 is adapted to be used with a container having a mouth or other opening to provide access to the container interior and to a product contained therein. The product may be, for example, a liquid comestible product. The product could also be any other liquid, solid, or gaseous material, including, but not limited to, a powder, particulate material, a food product, a personal care product, an industrial or household cleaning product, or other chemical compositions (e.g., compositions for use in activities involving manufacturing, commercial or household maintenance, construction, agriculture, etc.).

Container 2 would typically be a squeezable container having a flexible wall or walls which can be grasped by the user and squeezed or compressed to increase the internal pressure within the container so as to force the product out of the container and through closure 1. The container wall typically has sufficient, inherent resiliency so that when the squeezing forces are removed, the container wall returns to its normal, unstressed shape. Such a squeezable wall structure is preferred in many applications but may not be necessary or preferred in other applications. For example, in some applications it may be desirable to employ a generally rigid container and pressurize the container interior at selected times with a piston or other pressurizing system. It may also be desirable to employ a generally rigid container and to employ suction on the exterior of the valve to open the valve.

Although not shown in FIG. 1, a conventional, annular, "crab's claw" seal, or other type of conventional or special seal, could be provided to project downwardly from the inside of the closure to sealingly engage an annular portion of container 2 adjacent the opening in container 2.

Valve 3 is retained within closure 1 by means of a retainer ring 23 which is positioned in an annular groove 10A in the inside surface of closure spout 10 in a snap-fit engagement and which engages a peripheral portion of valve 3. In a presently preferred embodiment, the body of closure 1 (exclusive of valve 3) and retainer ring 23 are each molded from a thermoplastic material such as polypropylene. Retainer ring 23 and/or closure spout 10 are sufficiently deflectable (i.e., elastically deformable) to accommodate insertion of retainer ring 23 into spout 10 so as to effect the snap-fit engagement of the peripheral portion of retainer ring 23 in the spout annular channel 10A.

Figure 3:
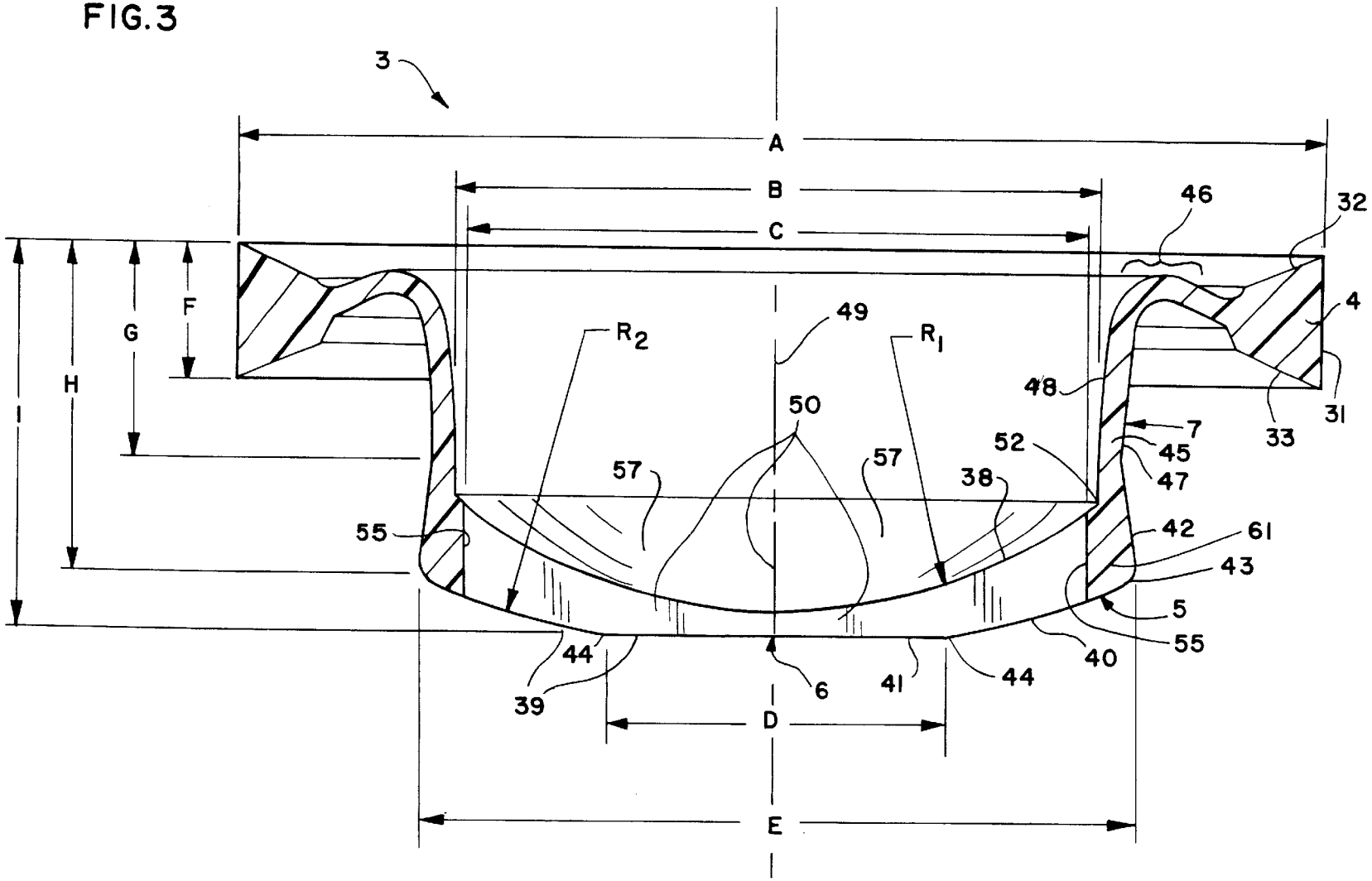
FIG. 3 is a greatly enlarged, cross-sectional view of the valve in the closure shown in FIGS. 1 and 2.

As shown in FIG. 3, valve 3 includes a marginal flange 4, a valve head 5 with a discharge orifice 6 therein, and a connector sleeve 7 which has one end connected with valve flange 4 and which has the opposite end connected with valve head 5 adjacent a marginal edge thereof. Connector sleeve 7 has a resiliently flexible construction, such that when pressure within container 2 is raised above a predetermined amount, valve head 5 shifts outwardly (FIGS. 7–11) in a manner which causes connector sleeve 7 to double over and then extend rollingly to a fully extended position where valve 3 becomes fully opened to accommodate discharge of the container contents.

Figure 2:
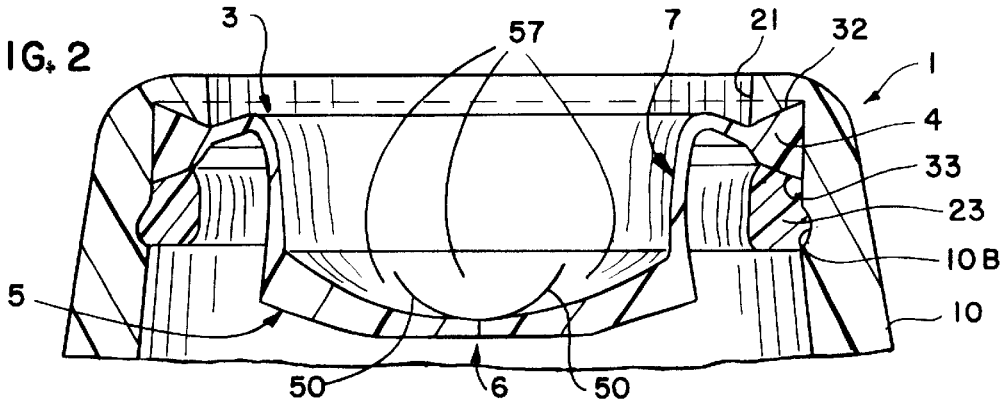
FIG. 2 is a fragmentary, cross-sectional view taken generally along the plane 2—2 in FIG. 1.

With reference to FIGS. 1–3, the illustrated dispensing valve 3 has an integrally formed or unitary, one-piece construction. Valve 3 has an interior side which interfaces with the fluid product in container 2. Valve 3 has an oppositely oriented exterior side which interfaces with ambient environment. Valve 3 is preferably molded from a resiliently flexible material, and in the illustrated example the material comprises a silicone rubber which is substantially inert so as to avoid reaction with, and/or adulteration of, the product being packaged. In one contemplated method of manufacturing valve 3 of the present invention, valve 3 is produced at relatively high speeds by the molding of liquid silicone rubber.

In the illustrated preferred embodiment, marginal flange 4 (FIG. 3) of valve 3 has an annular plan shape, and valve flange 4 has a substantially dove-tail cross-sectional configuration comprising an outer edge defined by a cylindrical wall 31, an outer or first frustoconical surface 32, and an inner or second frustoconical surface 33 with an outer rim 34 upstanding therefrom. Marginal valve flange 4 has substantial thickness between the outer, or first, frustoconical surface 32 and the inner, or second, frustoconical surface 33 which is resiliently compressed upon attachment of retainer ring 23 (FIG. 2) to form a secure leak-resistant seal therebetween.

In the preferred embodiment, the valve 3 has a head portion 5 (FIG. 3) which has a circular plan shape, and a generally tapered construction which is thicker at the radially outside portion of valve head 5, and thinner at the radially inside portion thereof. This tapered construction assists in achieving the snap open action of valve 3, as described below. More specifically, in the illustrated example, valve head 5 has an exterior side or surface 38 for interfacing with the ambient environment. Surface 38 preferably has an arcuately shaped side elevational configuration which opens or curves outwardly, toward the exterior of container 2, and surface 38 is defined by first, predetermined radius $R_1$ (FIG. 3). Valve head exterior surface 38 extends continuously to the interior sidewall of connector sleeve 7 which extends from the periphery of head 5 to marginal portion 4.

Valve head 5 also includes an interior side or surface 39 (FIG. 3) for interfacing with the product in container 2. Surface 39 has a marginal portion 40 that preferably has an arcuately shaped side elevational configuration which opens or curves outwardly, toward the exterior of the container 2, and is defined by a second predetermined radius $R_2$. Radius $R_2$ of marginal portion 40 on interior surface 39 is larger than radius $R_1$ of exterior surface 38, such that the two surfaces converge toward the center of valve head 5 at the center of orifice 6, and provide the above-noted inwardly tapered construction of valve head 5. Radius $R_1$ and radius $R_2$ may each be characterized as a spherical radius.

In the preferred form, interior surface 39 of valve head 5 also includes a center portion or planar central area 41, which has a circular plan shape, with a substantially planar or flat side elevational configuration, oriented generally perpendicularly to discharge orifice 6. The intersection of marginal portion 40 and planar central portion 41 of valve head 5 defines a circular edge 44. Planar central portion 41 of valve head 5 assists in improving the opening characteristic of valve 3, as set forth below.

In the preferred form of the valve, the outer perimeter of valve head 5 is defined by frustoconical marginal surface 42 which begins at a peripheral outer edge 43 of marginal portion 40, and extends outwardly therefrom with a slight taper, ultimately merging into connector sleeve 7. Edge 43 may be characterized as the interior side circular, peripheral edge. The outside diameter of valve head 5, as measured along peripheral edge 43, is substantially smaller than the inside diameter of marginal flange 4, as measured along the inner edge of the flange surface 32. This spacing between valve head 5 and marginal flange 4 permits valve head 5 to shift freely in an axial direction through the center of marginal flange 4.

Connector sleeve portion 7 illustrated in FIGS. 2 and 3 is in the form of a rolling diaphragm, having a hollow circular plan configuration, and a generally J-shaped longitudinal cross-sectional shape, comprising a cylindrical sidewall portion or sidewall 45, and a radially outwardly extending base portion 46. Connector sleeve 7 has interior and exterior surfaces 47 and 48, respectively, which, in the preferred embodiment, are spaced generally equidistantly apart along the length thereof, such that connector sleeve 7 has a substantially uniform thickness. One end portion of connector sleeve 7 is connected with valve head 5 adjacent the marginal surface 42 thereof, and the opposite end portion of connector sleeve 7 is connected with marginal valve flange 4.

Interior surface 47 of connector sleeve 7 at its inner end merges, and is contiguous with, marginal surface 42 of valve head 5, while the opposite end of connector sleeve 7 is connected with marginal valve flange 4 such that base portion 46 of connector sleeve 7 flares in a radially inwardly direction from marginal valve flange 4 and also protrudes outwardly toward the exterior of container 2 in an arcuate configuration. The arcuately flared shape of connector sleeve base portion 46 assists connector sleeve 7 in first doubling over, and then rollingly extending, as valve head 5 shifts outwardly in the manner descried in greater detail below. The marginal attachment of the inner end of connector sleeve 7 to valve head 5, as well as its associated geometry, increases the effectiveness of torque forces which assist in snapping valve 3 open, as discussed hereinafter.

The exterior surface 48 of sidewall 45 of connector sleeve 7 intersects exterior surface 38 of valve head 5 at an angle which defines a circular locus or edge 52. In the illustrated preferred embodiment of valve 3 shown in FIG. 3, the exteriormost area of sleeve arcuate base portion 46 is disposed slightly interior of the axially outermost part of marginal flange 4 so as to facilitate fabrication. The length of connector sleeve 7 is preferably selected sufficiently short to prevent sleeve 7 from folding in behind valve head 5 when valve head 5 is in the fully extended position (FIGS. 7–11), thereby avoiding interference with the reaction of valve head 5, which is explained in detail below.

The illustrated one-piece valve 3 preferably has a generally hat-shaped side elevational configuration in its original, normal condition, wherein valve head 5 assumes a generally concave shape. The resilient flexibility of connector sleeve 7 permits sleeve 7 to double over and then extend rollingly in the manner described hereinafter. Connector sleeve 7 acts as a rolling diaphragm with valve head 5 mounted at the center thereof in a manner which permits valve head 5 to shift or float freely inwardly and outwardly in an axial direction with respect to the opening 21 in closure spout 10.

In many applications, it is preferable to provide an overcap or cover (not illustrated) for closure 1. This may include a removable foil or other membrane seal (not illustrated) over opening 21 in the top of closure spout 10. Alternatively, a generally rigid overcap (not illustrated) could be mounted to closure 1 (e.g., with a tamper-evident tear-away band or with a threaded mounting arrangement, etc.). Any suitable special or conventional overcap or sealing system may be employed, the details of which form no part of the present invention.

In the illustrated preferred embodiment, valve 3 has a generally circular configuration about a longitudinal axis 49 (FIG. 3), and orifice 6 is defined by a plurality of slits 50 radiating laterally from axis 49. Preferably, there are four slits 50. Slits 50 extend transversely through head portion 5 from exterior side or surface 38 to interior side or surface 39.

In the illustrated preferred embodiment, slits 50 extend laterally from a common origin on axis 49 to define four flaps 57 (FIGS. 2 and 9) which flex outwardly to selectively permit the flow of product from container 2 through valve 3. Each slit 50 terminates in a radially outer end which, in the preferred embodiment, is located relatively close to the valve head circular locus 52 and marginal surface 42.

In the preferred embodiment, each slit 50 terminates in an end at a small distance radially inwardly from both the interior side circular, peripheral edge 43 (FIG. 3) and the exterior side circular edge or locus 52. In the preferred embodiment, each slit 50 has the same length, and each slit 50 terminates laterally beyond planar central area 41 (FIG.

3). Preferably, the end of each slit 50 defines a line 55 (FIG. 3) which is parallel to the longitudinal axis 49 of valve 3 and perpendicular to the valve head planar central area 41.

In the preferred embodiment, each slit 50 is planar. Each slit 50 preferably defines a linear locus along the head portion exterior side 38 and along the head portion interior side 39. Preferably, slits 50 diverge from an origin on axis 49 and define equal size angles between each pair of adjacent slits 50 so that flaps 57 are of equal size. Preferably, four slits 50 diverge at 90° angles to define two mutually perpendicular, intersecting, longer slits. Slits 50 are preferably formed by slicing through the valve head 5, without removing any substantial amount of material therefrom, so that the opposing side faces of adjacent valve flaps 57 closely seal against one another when discharge orifice 6 is in its normal, fully closed position. The length and location of slits 50 can be adjusted to vary the predetermined opening pressure of valve 3, as well as other dispensing characteristics. The generally annular portion of valve head 5 which is at the end of connector sleeve 7 between marginal surface 42 and slit ends 55 defines a ring portion 61 of the valve head 5, and ring portion 61 functions in the manner described in detail hereinafter.

It is to be understood that orifice 6 may assume many different shapes, sizes and/or configurations in accordance with those dispensing characteristics desired. For example, orifice 6 may also include five or more slits, particularly when larger or wider streams are desired, and/or the product is a particulate material or a liquid containing aggregates.

Dispensing valve 3 is preferably especially configured for use in conjunction with a particular container 2, and a specific type of product, so as to achieve the exact dispensing characteristics desired. For example, the viscosity and density of the fluid product are both important factors in designing the specific configuration of valve 3 for liquids, as is the shape, size, and strength of container 2, particularly when dispensing closure 1 is intended for use on a squeezable container 2 which contains motor oil. The rigidity and durometer of the valve material, and size and shape of both valve head 5 and connector sleeve 7, are also important in achieving the desired dispensing characteristics, and can be matched with both container 2 and the material to be dispensed therefrom.

Valve 3 is suitable for dispensing flowable products, such as liquids or even powder, particulates, or granular material, as well as suspensions of solid particles in a liquid. FIG. 3 shows various dimensions A, B, C, D, E, F, G, H, I, $R_1$ and $R_2$, the magnitude of which can be selected or adjusted, depending upon the following: (1) the material to be dispensed, (2) the material from which the valve 3 is made, and (3) the flow rate desired. In one preferred embodiment, the thickness of sleeve 7 can be about 0.02 inch, preferably about 0.018 inch, and the valve can be injection molded from liquid silicone rubber sold under the designation DC-595 by Dow Corning Corporation in the United States of America.

Experimental tests conducted on some valves having various dimensions and characteristics indicate that valve 3 snaps fully open (FIG. 9) when exposed to a pressure inside the container 2 equal to approximately 16 inches of water (and normal atmospheric pressure exists on the exterior of the valve). That minimum pressure which causes valve 3 to snap open is generally referred to herein as the predetermined dispensing pressure or opening pressure relative to ambient atmospheric pressure. The predetermined internal opening pressure would have to be greater, of course, if container 2 and valve 3 were operated in an ambient external pressure that was greater than normal atmospheric pressure.

As explained in detail hereinafter, valve 3 will remain open even after the squeezing pressure on container 2 is terminated. Fluid can continue to drain from an inverted container 2 through the open valve 3 even though container 2 is not being squeezed.

It is to be understood that, according to the present invention, valve 3 may assume different shapes and sizes, particularly in keeping with the type of container 2 and product to be dispensed therefrom. The predetermined opening pressure of valve 3 may be varied widely in accordance with those dispensing criteria desired for a particular product. Flow characteristics of the dispensed product can also be adjusted substantially, such as for relatively wide column-like streams, thin needle-like streams, and the like.

In operation, closure 1 functions in the following manner. Valve 3 normally assumes the inwardly protruding orientation illustrated in FIG. 4, wherein valve 3 remains substantially in its original molded shape without deformation, with connector sleeve 7 being fully retracted and discharge opening 6 being fully closed. When valve 3 is mounted in the top of container 2, as is shown in FIG. 1, valve 3 is configured such that discharge orifice 6 will remain securely closed after container 2 is inverted (FIG. 4), even under the hydraulic head pressure applied thereto by a fluid product 18 when the container 2 is completely full.

The process for opening the valve outwardly requires that a pressure differential be established across the valve—with the pressure on the interior of the valve being greater than the pressure on the exterior of the valve. This could be effected by establishing a suction or reduced pressure at the valve exterior. For example, if the valve was mounted in the opening or spout of a drink bottle or other container, then the user could lift the bottle, tilt it toward the mouth, and suck on the spout to establish a differential pressure sufficient to open the valve. Alternatively, if the bottle is squeezable, then the user can either (1) merely squeeze the bottle to increase the pressure on the interior of the valve, or (2) both suck on the spout and squeeze the bottle at the same time.

Figure 4:
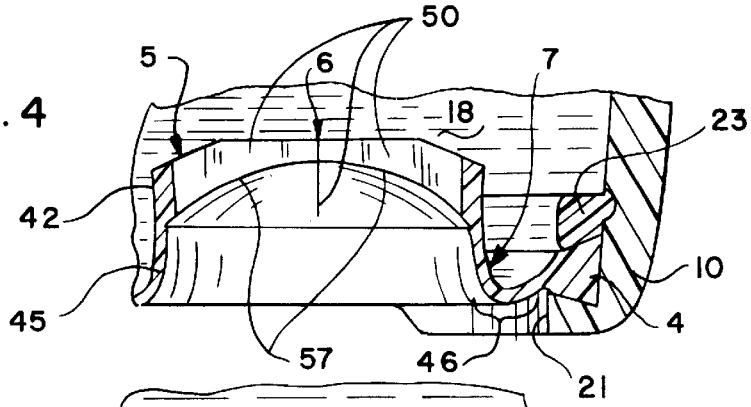
FIG. 4 is a fragmentary, cross-sectional view similar to FIG. 2, but the cross section view plane in FIG. 4 has been rotated 45 degrees about the valve vertical axis compared to FIG. 2.
Figure 5:
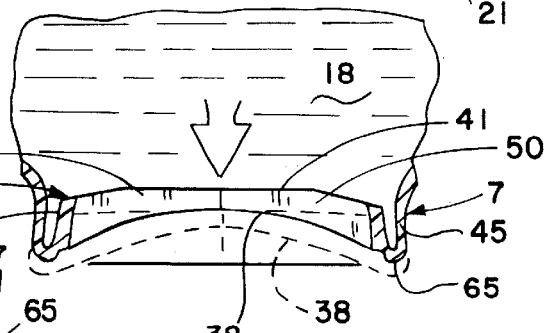
FIGS. 5, 5A, 6, and 7 are each cross-sectional views similar to FIG. 4, and FIGS. 5, 5A, 6, and 7 illustrate seriatim the sequence of operation of the valve to dispense product—FIG. 7 showing the final, full open condition of the valve as illustrated in cross section taken generally along plane 7—7 in FIG. 11.

When a sufficient additional pressure differential is established across the valve, connector sleeve 7 functions as a rolling diaphragm, and permits valve head 5 to begin shifting axially outwardly toward the exterior of dispensing closure 1 by doubling over connector sleeve 7, which then in turn, begins to extend outwardly in a rolling fashion, as illustrated in FIG. 5. The outwardly protruding J-shaped configuration of connector sleeve 7 (FIG. 4) assists in initiating this rolling motion of connector sleeve 7. The elastic deformation of connector sleeve 7 from its molded shape (FIG. 4), generates a complex pattern of stresses within valve 3 which tends to resiliently urge valve 3 back into its original or normal configuration. Such stresses also include an outwardly directed torque applied by connector sleeve 7 to valve head 5 adjacent marginal surface 42, and this torque tends to resiliently urge discharge orifice 6 toward its open position, as described in greater detail below.

When the pressure differential across the valve is increased further, as by establishing more suction on the valve exterior or by increasing the pressure in the container 2, as illustrated in FIG. 5, valve head 5 continues to shift axially outwardly by rolling connector sleeve 7 over upon itself. The marginal surface 41 of valve head 5 passes through the center of marginal valve flange 4.

When the pressure differential across the valve is increased further, as by establishing more suction on the valve exterior or by increasing the pressure in the container 2, valve head 5 continues to extend outwardly toward the exterior of dispensing closure 1 until connector sleeve 7 is substantially fully extended, as illustrated in FIG. 5. When valve head 5 is in the substantially fully extended position (FIG. 5), the forces built up in connector sleeve 7 cause the sidewall portion 45 of connector sleeve 7 to assume a generally cylindrical shape which is generally concentric with, and about, the marginal surface 42 of valve head 5. Sidewall 45 of connector sleeve 7 is folded back 180 degrees from its original molded shape, to an orientation nearly parallel with the marginal surface 42 of valve head 5. The end of sleeve 7 adjacent valve head 5 defines an exterior lip or rim 65 when valve 3 is in the substantially fully extended position (FIG. 5).

When the pressure differential across the valve is increased further, as by establishing more suction on the valve exterior or by increasing the pressure in the container 2, as illustrated in dashed lines in FIG. 5, valve head 5 continues to shift outwardly. However, because connector sleeve 7 is substantially fully extended, further outward shifting of valve head 5 longitudinally tensions or stretches connector sleeve 7, thereby increasing the outwardly directed torque applied to valve head 5. Also, the further outward movement of valve head 5 tends to flatten or straighten valve head 5, particularly along the exterior surface 38 thereof, as best illustrated in dashed lines in FIG. 5. This flattening motion tends to slightly enlarge or dilate the circular plan configuration of valve head 5, which enlargement is in turn resisted by radially inwardly directed forces applied to the marginal surface 42 of valve head 5 by connector sleeve 7, thereby generating another complex pattern of stresses within valve 3, and these include stresses which tend to compress valve head 5 in a radially inward direction. Due to the tapered shape of valve head 5, the majority of compression strain is believed to take place adjacent the planar central portion 41 of valve head 5. As best illustrated by a comparison of the dashed line figure and the solid line figure in FIG. 5, when connector sleeve 7 is in the substantially fully extended position, as shown in the solid lines, and the pressure differential across the valve is further increased, the valve exterior rim 65 moves slightly axially outwardly and radially outwardly as shown in the dashed lines of FIG. 5. The marginal edge 42 of valve head 5 is shown bent or elastically deformed inwardly as a consequence of the torque forces applied thereto by connector sleeve 7.

Figure 5A:
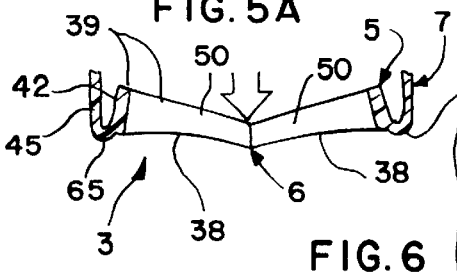
Figure 6:
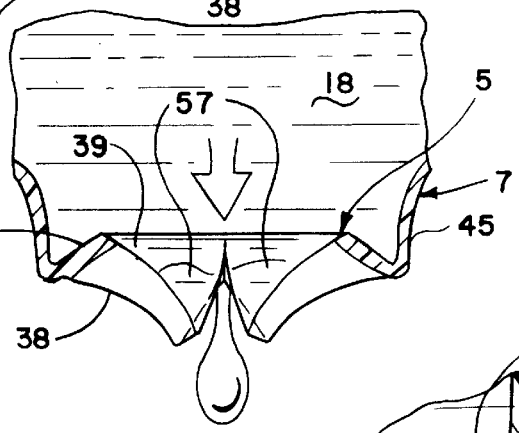
Figure 7:
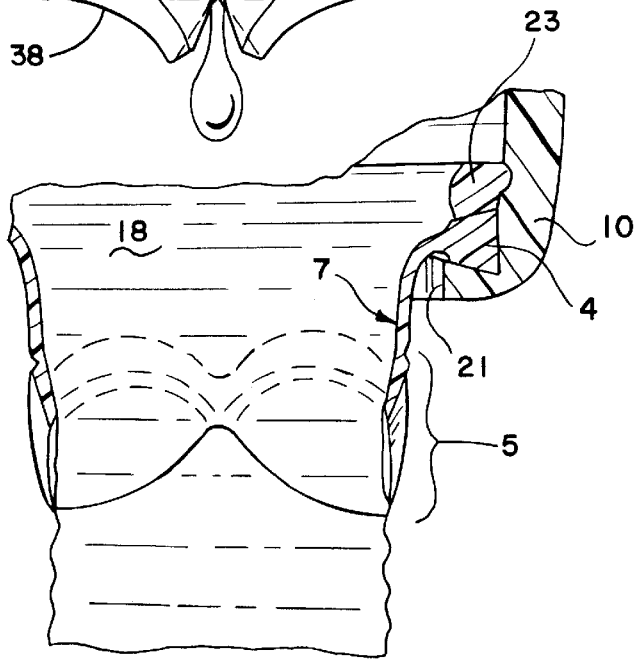

When the pressure differential across the valve is increased further, as illustrated in FIG. 5A, valve head 5 continues to shift outwardly by further longitudinal stretching of connector sleeve 7, and further enlargement of the plan shape of valve head 5. Exterior rim 65 moves from the position illustrated in dashed lines FIG. 5, in an axially outwardly and radially outwardly fashion, to the position shown in FIG. 5A. In FIG. 5A, the marginal edge 42 of valve head 5 is shown more bent or elastically deformed inwardly, as a consequence of the increased torque forces applied thereto by connector sleeve 7. These combined forces and motions also serve to further compress valve head 5 into a state of bifurcation, as illustrated in FIG. 5A, wherein the combined forces acting on valve head 5 will, upon application of any additional outward force on the interior side 39 of valve 3, cause valve 3 to quickly open outwardly to separate valve flaps 57 in the manner illustrated in FIGS. 7–11, and thereby dispense the product 18 through discharge orifice 6 (FIG. 6). FIG. 6 shows a transient condition wherein the valve is just beginning to open. Valve 3 continues to open to the full open configuration shown in FIGS. 7–11.

The bifurcation state of valve 3, as the term is used herein, is illustrated in FIG. 5A, and defines a relatively unstable condition which valve 3 assumes immediately prior to valve flaps 57 starting to open. As valve 3 passes through the bifurcation state shown in FIG. 5A, the combined forces acting on valve head 5 are in a temporary, unstable condition of equilibrium for a given moment, and then quickly shift valve head 5 into a generally convex shape, simultaneously opening orifice 6. In the bifurcation state shown in FIG. 5A, valve head 5 assumes the shape of a nearly planar disc, but with exterior surface 38 cupped inwardly between rim 65 and the center of orifice 6. Interior surface 39 is bent slightly outwardly toward the center of orifice 6.

The valve bifurcation condition (FIG. 5A) is relevant to the valve operation when the valve is subjected to increasing pressure differential (where the internal pressure is increasingly greater than the external pressure), but before valve 3 has fully opened (FIGS. 7–11). Although valve 3 begins to open beyond the bifurcation state at a predetermined pressure (assuming that the exterior of the valve is exposed to a normal ambient atmospheric pressure), the internal pressure actually required to prevent valve flaps 57 from closing is actually somewhat less than the predetermined opening pressure. However, if the predetermined opening pressure is maintained or increased (or if the exterior pressure is decreased), valve flaps 57 continue to rapidly move, bend, and snap outwardly. It is presently believed that eventually valve flaps 57 are sufficiently bent and deformed to a point beyond which they will not close, even if the internal pressure is completely removed. It is believed that this point may be characterized as an outer bistable point, bistable position, or bistable condition. It is believed that if the internal pressure could be quickly removed or substantially reduced as valve flaps 57 are rapidly opening toward a position almost at, but not beyond, the outer bistable position, then valve flaps 57 will close. On the other hand, if the predetermined internal opening pressure is maintained (or increased) as valve flaps 57 move just past the outer bistable position, then valve flaps 57 will continue to the fully open position (FIGS. 7–11) with a snap-like movement even if the internal pressure is subsequently decreased to zero after valve flaps 57 have deformed outwardly just past the outer bistable position.

As can be clearly seen in FIGS. 8–11, valve flaps 57 open significantly more than 90°. Compared to the closed configuration shown in FIGS. 3 and 4, the open configuration of valve 3 shown in FIG. 8 has valve flaps 57 opened about 130°–150° or more. Valve flaps 57 move and deform through the outer bistable position or condition to the stable, fully open position shown in FIGS. 7–11. The stresses within valve 3 are apparently lower when flaps 57 are in the fully open condition as shown in FIGS. 7–11 than when flaps 57 are not quite completely or fully open. Thus, flaps 57 remain in the fully open position in which valve 3 is in a stable condition.

Valve 3 will remain fully open as shown in FIGS. 7–11 even when the internal fluid pressure forces are removed. Thus, even when the user stops squeezing container 2, flaps 57 of valve 3 will remain fully open. Hence, the user can merely hold container 2 in an inverted position, and the fluid will drain out through open valve 3 without further squeezing pressure being applied to container 2. This allows the user to let go of container 2 while container 2 is otherwise supported in an inverted orientation against another surface (e.g., in a funnel or against the inside wall of a sink or bucket), and the fluid will still drain out of container 2 through open valve 2.

Such a technique is especially suitable for emptying motor oil from a container 2 through a funnel into the oil fill opening in an automobile engine. Container 2 can first be inverted over the engine and funnel without initially squeezing container 2. Valve 3 remains closed, and the oil will not flow out over the engine even though container 2 is inverted. After the user has properly positioned container 2 over a funnel in the engine oil fill opening, the user need only briefly squeeze container 2 to fully open valve 3. As the oil begins to flow out of fully open valve 3, the user can stop squeezing container 2. The user can then place the inverted container 2 in the fennel so that it is supported in the inverted position by the funnel as the oil drains out of container 2, and the user can let go of container 2 and do other things while the oil drains out of container 2 and through the funnel into the engine.

The valve of the present invention also has the capability for being put back into the normally closed configuration—even if a quantity of fluid remains in the container. Valve 3 can be closed by pushing the open flaps 57 back toward the closed configuration. All four flaps 57 tend to snap fully closed after one or more of flaps 57 have been bent or pivoted partway back toward the fully closed configuration. If the user wants to close valve 3 while some product (e.g., liquid, particulated matter, etc.) is still flowing from the container, then it would be generally preferable to first return container 2 to the upright orientation before pushing valve flaps 57 closed. That would eliminate, or at least minimize, the possibility of getting some of the product on the exterior of valve 3 and/or the user's finger, and that would also allow the user to better see that flaps 57 have properly closed.

When valve 3 is fully open, radially inward compression of the valve head or base region of flaps 57 by connector sleeve 7, in addition to outwardly oriented torque applied thereto by connector sleeve 7, combine to keep discharge orifice 6 in the fully open condition. A threshold pressure is required to initially force valve 3 to the fully extended, fully opened stable configuration illustrated in FIGS. 7–11. The snap type opening of valve 3 is achieved, at least in part, by the torque exerted on valve head 5 by connector sleeve 7, which as noted in the example illustrated in FIGS. 4–11, is sufficient to substantially distort the shape of the marginal edge 42 of valve head 5.

Figure 8:
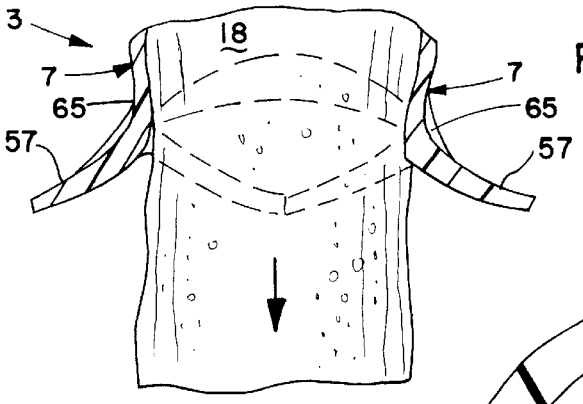
FIG. 8 shows the same full open condition of the valve as FIG. 7, but FIG. 8 is a fragmentary cross-sectional view taken generally along plane 8—8 of FIG. 11.
Figure 10:
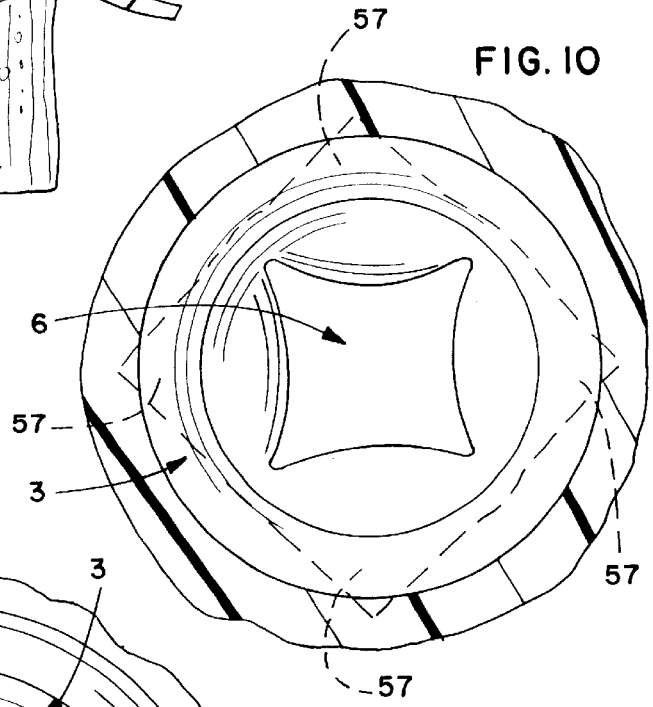
FIG. 10 is a cross-sectional view taken generally along the plane 10—10 in FIG. 9.
Figure 11:
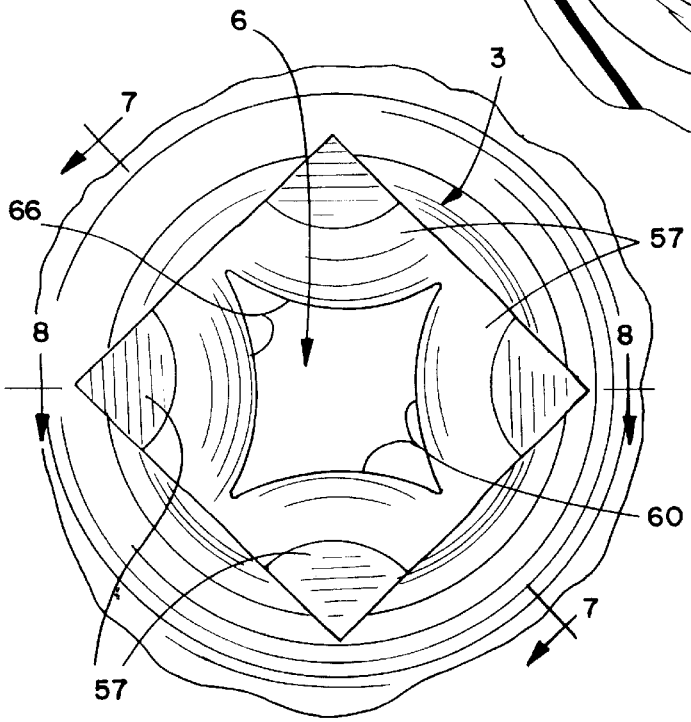
FIG. 11 is a cross-sectional view taken generally along the plane 11—11 in FIG. 9.
Figure 9:
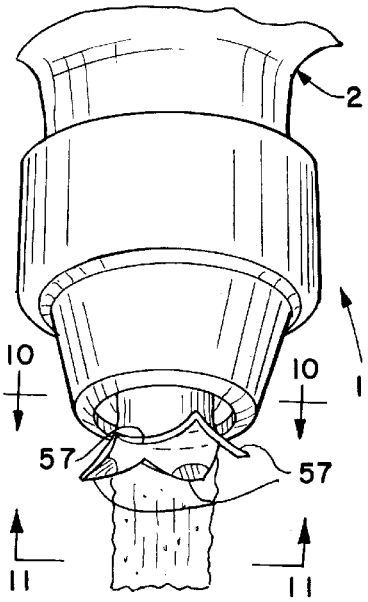
FIG. 9 is a perspective view of the inverted container and closure showing the valve in the full open condition dispensing product.

When the preferred form of the open valve is viewed from the bottom as in FIG. 11, the exterior edges of the fully open flaps 57 define a square shape. When valve 3 assumes the fully extended and fully open position illustrated in FIGS. 7–11, portions of valve 3 are significantly bent and distorted or elastically deformed. As can be seen in FIG. 8, rim area 65 and the adjacent part of connector sleeve 7 are bent or deformed somewhat inwardly in a concave orientation. As seen in FIG. 11, the inward deformation defines an arcuate surface 66 along the inside of each flap 57 on the periphery of discharge orifice 6. The inward bulging of each flap 57 at and adjacent the base or rim 65 (FIG. 8) tends to keep discharge orifice 6 in the fully open condition, even after all internal pressure has been removed. Thus, after the user stops squeezing container 2, valve 3 will remain open as the fluid or other product flows out. Even after all of the product has been discharged from container 2, valve 3 will remain open unless pushed closed by the user. A sufficient minimum force is required to push one or more of the open valve flaps 57 closed so that all of the flaps 57 will overcome the elastic deformation of the open configuration and return to the fully closed configuration.

The resiliency of connector sleeve 7 serves to resist the dilating action of valve head 5, and thereby compresses valve head 5 to help achieve a snap open and snap close motion. The resiliency of connector sleeve 7 can be varied somewhat, such as by making connector sleeve 7 thicker or thinner. This can result in a greater or lesser degree of snap action built into the valve for a specific application. Similarly, the size and resilient strength of ring 61 (the exterior peripheral portion of valve head 5 as illustrated in FIG. 3) can be adjusted to increase or decrease somewhat the desired snap action.

Because the combined compression and torque forces acting on head 5 of valve 3 by connector sleeve 7 open flaps 57 to a generally predetermined maximum open configuration, the rate of flow of the product from container 2 through the valve discharge orifice 6 remains substantially constant during the majority of the time period when the product is flowing out of container 2.

In some embodiments of closure 1, such as when closure 1 is to be used for dispensing motor oil from container 2, container 2 will be designed with relatively stiff sidewalls which resume their original shape after being squeezed. In such embodiments, the suck back of air into container 2 after dispensing fluid product therefrom is typically desired to prevent collapsing the container 2, and thereby facilitate continued ease of dispensing until container 2 is completely empty.

In the preferred form of the valve, the reciprocating motion of valve head 5 on rolling connector sleeve 7 provides dispensing closure 1 with several important advantages. For example, connector sleeve 7 is preferably configured with sufficient flexibility that abnormal pressure increases developed within the interior of container 2, such as those caused by thermal expansion, or the like, are offset by the axial shifting motion of valve head 5 with respect to connector sleeve 7, so as to alleviate excess pressure on discharge orifice 6. In this manner, if closure 1 were used in conjunction with a container of motor oil and the ambient temperature rises, the internal container pressure will increase, but the increased pressure, instead of acting directly at discharge orifice 6 in a manner which might cause it to inadvertently open, causes valve head 5 to shift axially outwardly to relieve any such increased pressure, and thereby prevent any inadvertent leakage of the fluid product from dispensing closure 1.

Another example of the benefits achieved by the rolling diaphragm action of connector sleeve 7 and the axial reciprocating motion of valve head 5 is that connector sleeve 7 is preferably configured with sufficient flexibility that any misalignment and/or distortion of the valve flange 4, such as that experienced when attaching the valve to container 2, are not transmitted to valve head 5, thereby permitting unhindered operation of discharge orifice 6. As previously noted, due to the inherently sticky nature of liquid silicone rubber, the attachment of a molded silicone rubber valve 3 to container 2 can be quite difficult, and often results in some type of unequal compression and/or distortion of the marginal flange 4 of valve 3. Without the rolling diaphragm action of connector sleeve 7, any such distortion is communicated directly to valve head 5, and this in turn can distort discharge orifice 6, and alters important design characteristics such as its predetermined opening pressure, flow rate, etc. The rolling diaphragm connector sleeve 7 associated with the present valve 3 tends to insulate or isolate valve head 5 from marginal flange 4 such that it can float freely, and thereby avoid such problems.

Yet another example of the benefits achieved by this aspect of the present invention is that connector sleeve 7 is preferably configured with sufficient flexibility that vibrations, shock impact forces, and the like applied to container 2 are absorbed and/or dampened by shifting valve head 5 on rolling connector sleeve 7, so as to avoid inadvertent opening of discharge opening 6. Even if the container with dispensing closure 1 is dropped onto the floor, slammed forcefully against a work surface, or otherwise jarred or shook, the shock forces arising from the acceleration and/or deceleration of the product within container 2 would otherwise be communicated directly with the discharge orifice 6, and tend to cause it to open inadvertently. However, the rolling connector sleeve 7 action of valve 3 serves as a cushion or shock absorber for such shock impact forces, and thereby greatly minimizes the likelihood of inadvertent discharge of fluid product from dispensing closure 1. In a similar manner, when dispensing closure 1 is used for non-homogenous fluids, or the like, which are typically shook prior to use, connector sleeve 7 assists in absorbing these vibrations, and thereby helps prevent leakage.

Yet another example of the benefits achieved by this aspect of the present invention is that connector sleeve 7 is preferably configured with sufficient flexibility so that only very moderate pressures, substantially lower than the predetermined opening pressure of valve 3, are required to shift valve head 5 from the fully retracted position (FIG. 4) to the fully extended position (FIG. 5), thereby improving the dispensing "feel" of closure 1. When the user grasps container 2, even a very light squeeze on sidewalls will rollingly extend connector sleeve 7 and valve head 5 to the fully extended, but still closed configuration, shown in FIG. 5, at which point valve head 5 halts momentarily, and further movement of the fluid product is resisted until additional forces are exerted on container 2 which result in an internal pressure within container 2 greater than the predetermined opening pressure of valve 3. This motion of connector sleeve 7 and valve head 5 is sensed by the user through touch or feel, typically in the form of a vibration or ripple experienced in container sidewalls when valve head 5 reaches the fully extended position (FIG. 10). This ripple motion signals the user that valve head 5 is fully extended, and that further pressure will cause valve 3 to snap open and dispense fluid products. When valve 3 snaps open, similar vibrations or ripples are communicated to the user through container sidewalls to assist in achieving accurate flow control.

In the illustrated example of dispensing closure 1, valve 3 is mounted within container 2 in a manner which causes valve head 5 to shift between (1) the fully retracted position shown in FIG. 4 wherein valve 3 is recessed, or disposed wholly, within the interior of container 2 for safely storing valve 3, and (2) the fully extended discharge position shown in FIGS. 7–11 wherein valve head 5 and associated orifice 6 are disposed wholly outside container 2 for neatly dispensing the product therethrough. By shifting valve head 5 between these two extreme positions, valve 3 can remain normally unexposed and secure within the container 2 when not in use, without sacrificing neatness when dispensing. Also, valve head 3 is preferably positioned in container 2 so that arcuate base portion 46 of connector sleeve 7 is disposed adjacent the end of closure spout 10 so that if the package is slammed down onto a surface, abutment between valve 3 and the surface will prevent valve 3 from shifting to the fully extended position, and thereby keep orifice 6 closed to prevent inadvertent leakage.

Dispensing closure 1 is extremely versatile, being capable of easily and neatly dispensing a wide variety of products. The "stay-open" valve 3 is matched with both the container 2 and the type of liquid product to be dispensed therefrom, so as to securely seal, yet readily open upon manipulation by the user, without requiring excess pressure or forces. The resiliently flexible connector sleeve 7, which is configured to double over and extend rollingly, accommodates for thermal expansion within container 2, absorbs shock impact forces to the container, accommodates misalignment and/or distortion which might be applied to the valve flange in attaching the same to the container, and provides a unique dispensing feel which greatly facilitates accurate dispensing. Valve 3 is configured so that when orifice 6 snaps open, a generally constant flow rate is established therethrough, even when container 2 is subjected to a relatively wide range of pressures.

In a preferred embodiment of valve 3 illustrated in FIG. 3, sleeve exterior surface 48 connects with valve head 5 along the circular locus 52. The four slits 50 that extend (1) transversely through valve head 5 from exterior side 38 to interior side 39 also extend laterally from a common origin (axis 49) so that flaps 57 are defined by slits 50 with each slit 50 terminating in an outer end 55 which is located at a distance radially inwardly from the circular locus 52. The distance is less than about 21%, and is preferably about 4%, of the diameter of circular locus 52.

In the preferred embodiment of valve 3 illustrated in FIG. 3, the outer end 55 of each slit 50 is also preferably located at a distance radially inwardly from the interior side circular, peripheral edge 43, and that distance is less than about 24%, and is preferably about 7%, of the diameter of the interior side circular, peripheral edge 43.

It is also contemplated that the valve could have a different structure than shown in FIGS. 1–11. For example, with reference to FIG. 2, the valve sleeve 7 could have an initial, as-molded, rest configuration projecting outwardly relative to the closure 1 (rather than inwardly as illustrated) so that the valve head 5 is located outwardly of the valve flange 4 (rather than inwardly as illustrated).

It will be readily apparent from the foregoing detailed description of the invention and from the illustrations thereof that numerous variations and modifications may be effected without departing from the true spirit and scope of the novel concepts or principles of this invention.

What is claimed is:

1. A dispensing valve for being sealingly disposed with respect to, and dispensing a product from, a discharge opening of a container, said valve comprising:

a marginal portion adapted to be sealingly engaged when said valve is sealingly disposed with respect to the container discharge opening;

a head portion that (1) is laterally inwardly of said marginal portion, (2) has an exterior side for interfacing with ambient environment, and (3) has an interior side for interfacing with the product; said head portion having a laterally outwardly flared crown shape defined, at least in part, by a peripheral surface which tapers laterally inwardly to prevent nesting with another, identical valve during handling; said head portion exterior side having a laterally outer portion with an arcuate side elevational shape defined by a first radius; said head portion interior side having a planar central area and a laterally outer portion with an arcuate side elevational shape defined by a second radius which is greater than said first radius such that said outer portions of said exterior and interior sides converge toward said planar central area of said head portion to provide a tapered construction with reduced thickness;

said head portion interior side having a periphery defined by a circular, peripheral edge; said head portion including a normally closed orifice defined by a plurality of slits that extend (1) transversely through said head portion from said exterior side to said interior side, and (2) laterally from a common origin whereby flaps are defined by said slits with each slit terminating in an outer end which is located laterally beyond said planar central area at a distance radially inwardly from said interior side circular, peripheral edge; said distance from said peripheral edge being about 7% of the diameter of said peripheral edge; and a resilient, flexible, connector sleeve having (1) a first end portion thereof connected with said marginal portion, and (2) a second end portion thereof connected with said head portion; the thickness of said sleeve being substantially constant between said first and second end portions; said connector sleeve having an interior surface for interfacing with the product and having an exterior surface for interfacing with ambient environment; said first end portion of said connector sleeve having a J-shaped cross section which extends into said marginal portion to facilitate movement of said head portion when dispensing product from the container; said sleeve exterior surface connecting with said head portion along a circular locus; said connector sleeve having a sidewall with a configuration which extends rollingly to shift said head portion outwardly when pressure within said container exceeds the exterior pressure by a predetermined amount;

each said slit outer end also being located at a distance radially inwardly from said circular locus; said distance from said circular locus being about 4% of the diameter of said circular locus; said orifice opening by outward displacement of said flaps when the pressure in the interior of the container exceeds the pressure on the exterior of the valve by a predetermined amount; and said orifice remaining open even when the pressure on the interior of the container does not exceed the pressure on the exterior of the valve.

* * * * *